No. 653,900. Patented July 17, 1900.
T. J. BRAY.
METHOD OF FORMING WELDED RINGS.
(Application filed Oct. 14, 1899.)
(No Model.) 2 Sheets—Sheet 1.
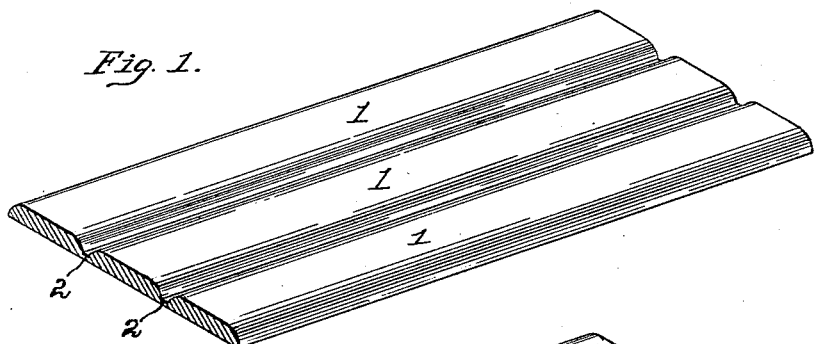
Fig. 1.
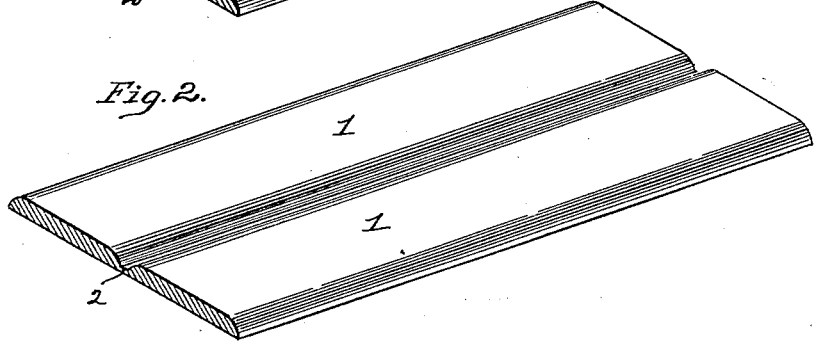
Fig. 2.
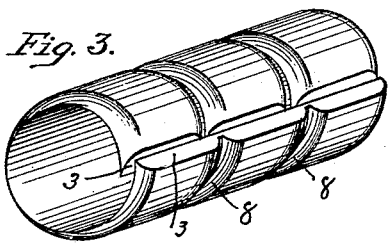
Fig. 3.
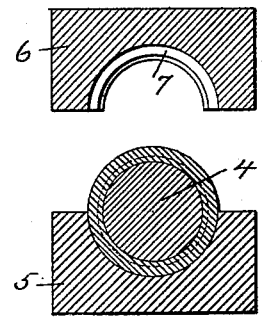
Fig. 4.
Fig. 5.

No. 653,900. Patented July 17, 1900.
T. J. BRAY.
METHOD OF FORMING WELDED RINGS.
(Application filed Oct. 14, 1899.)
(No Model.) 2 Sheets—Sheet 2.

Witnesses:

Inventor:
Thomas J. Bray
By Kay & Totten
Attorneys.

UNITED STATES PATENT OFFICE.

THOMAS J. BRAY, OF PITTSBURG, PENNSYLVANIA, ASSIGNOR TO THE NATIONAL TUBE COMPANY, OF SAME PLACE AND NEW YORK, N. Y.

METHOD OF FORMING WELDED RINGS.

SPECIFICATION forming part of Letters Patent No. 653,900, dated July 17, 1900.

Application filed October 14, 1899. Serial No. 733,547. (No model.)

*To all whom it may concern:*

Be it known that I, THOMAS J. BRAY, a resident of Pittsburg, in the county of Allegheny and State of Pennsylvania, have invented a new and useful Improvement in Methods of Forming Welded Rings; and I do hereby declare the following to be a full, clear, and exact description thereof.

My invention relates to the forming of circular articles—such, for example, as rings, bands, pipe-couplings, thread-protectors, or like articles—its object being to provide for the formation of two or more such rings at one time, so as to reduce the labor and to provide for the making of such articles from wide strips instead of the narrow strips or bands usually employed. In the formation of such rings or bands a bar corresponding in width to two or more such rings, but of substantially the same thickness throughout, has been bent to weld at one time to form two or more such rings, the dies forging the rings and thinning or separating the metal between them, so as to form two or more such rings at one welding operation. This has required considerable work on the part of the dies or rolls, and the object of the present invention is to overcome the necessity of such heavy work by the dies or rolls.

My invention consists in forming such welded rings or like articles by rolling a bar so as to form a series of thick portions each corresponding in width to the length of one of the rings to be formed and connected by thin webs, cutting the same transversely into blanks and bending the blanks and welding them at one operation into ring form.

It also consists in certain other improvements, as hereinafter set forth.

To enable others skilled in the art to make and use my invention, I will describe the same more fully, referring to the accompanying drawings, in which—

Figure 6:
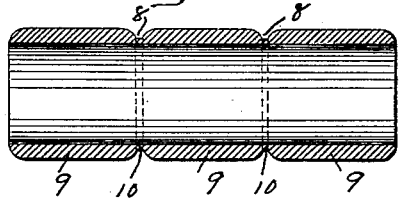
Figure 7:
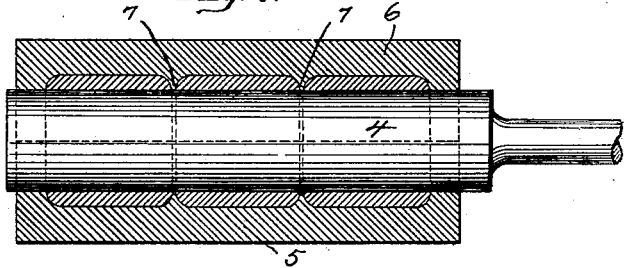
Figure 8:
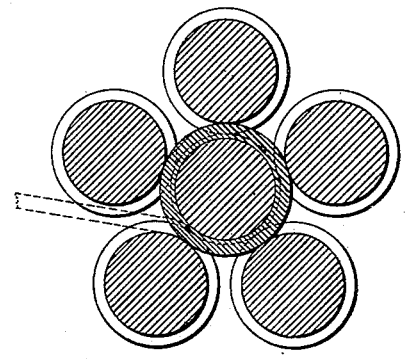

Figures 1 and 2 are sections of the bar as rolled for the production of the rings or bands. Fig. 3 shows the bar cut into blanks and bent into form for welding in dies. Fig. 4 is a longitudinal section of hammer-dies, showing the process of welding the blanks. Fig. 5 is a cross-section of such dies on the line 5 5, Fig. 4. Fig. 6 is a cross-section of the welded rings where still connected by thin webs. Fig. 7 is a section of the mandrel, showing a number of such rings thereon, illustrating how the rings may be separated in the welding operation; and Fig. 8 is a cross-section of a set of rolls suitable for welding the blanks by a rolling operation.

Like figures indicate like parts in each view.

In practicing the invention I take a bar such as shown in Figs. 1 or 2, the bar being rolled with a series of thick portions 1, corresponding to the different rings to be formed, connected by thin web portions 2. Such rings are then sheared to proper length for welding, it being preferred that their edges shall be scarfed, as shown at 3, Fig. 3, so providing for the formation of a lap-weld between the ends of the rings. The rings may be welded either with dies or rolls, as desired. I have illustrated the invention particularly where the rings are welded in dies, the blanks being bent into skelp form and heated and placed over a mandrel 4 and then inserted between the hammer-dies, the mandrel resting upon the anvil-die 5, while the reciprocating or upper die 6 forms the weld, the mandrel carrying the blank being turned at intervals during the welding-strokes. The mandrel employed is the ordinary mandrel for such welding operations, but, as shown in the drawings, the dies are provided with annular projections 7, corresponding to the depressions 8 in the blanks, and as the blanks are welded in the dies the edges of each ring to be formed are properly swaged to bring them to the exact shape desired by means of such annular projections 7, the side faces of which correspond in shape to the end portions of the different rings so to be formed. In forming the rings they may either be separated during the welding operation or the blank may be welded into several rings, the finished rings 9 being connected by thin webs, as at 10. In the former case the annular projections 7 are of a height corresponding to the thickness of the blanks, so that in the welding operation the different rings formed may be separated the one from the other. In the latter case such projections are of less height than thickness of the rings. The latter course is preferred in the forming of pipe-couplings or thread-protectors for pipe where the inner faces of the rings are to be threaded, the threading of the same serving also to separate the rings. A welded blank composed of a number of such rings can in this way be fed to the threading-machine instead of the necessity of feeding them one by one, which reduces the cost thereof. I am thus enabled to produce a number of rings at one operation, thus largely cheapening the cost and labor, because the wide bars for several rings can be produced at less cost than the narrow bars corresponding to small rings, and the cost and labor of welding several rings together are no greater than that of welding single rings, and in so doing I relieve the dies or welding devices from any great strain in swaging the several rings from the bar, overcoming great wear upon the projecting flanges or of the dies which form the end faces of the several rings welded at the one operation.

What I claim as my invention, and desire to secure by Letters Patent, is—

1. The method of forming welded rings, or like articles, consisting in rolling a bar so as to form a series of thick portions each corresponding in width to the length of one of the rings to be formed and connected by thin webs, cutting the same transversely into blanks, and bending the blanks and welding them at one operation into ring form, substantially as set forth.

2. The method of forming welded rings, or like articles, consisting in rolling a bar so as to form a series of thick portions each corresponding in width to the length of one of the rings to be formed and connected by thin webs, cutting the same transversely into lengths and bending the blanks, and welding them into ring form and separating them into several rings at one operation, substantially as set forth.

In testimony whereof I, the said THOMAS J. BRAY, have hereunto set my hand.

THOMAS J. BRAY.

Witnesses:
GRACE C. RAYMOND,
ROBERT C. TOTTEN.